United States Patent
Takahashi et al.

(10) Patent No.: US 10,540,943 B2
(45) Date of Patent: Jan. 21, 2020

(54) DISPLAY CONTROL APPARATUS AND DISPLAY CONTROL METHOD

(71) Applicant: SONY CORPORATION, Tokyo (JP)

(72) Inventors: Kei Takahashi, Tokyo (JP); Yasushi Okumura, Tokyo (JP); Yoshihito Ohki, Tokyo (JP); Ikuo Yamano, Tokyo (JP); Hiroyuki Mizunuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/126,041

(22) PCT Filed: Feb. 17, 2015

(86) PCT No.: PCT/JP2015/054266
§ 371 (c)(1),
(2) Date: Sep. 14, 2016

(87) PCT Pub. No.: WO2015/146372
PCT Pub. Date: Oct. 1, 2015

(65) Prior Publication Data
US 2017/0098434 A1    Apr. 6, 2017

(30) Foreign Application Priority Data

Mar. 25, 2014  (JP) .................................. 2014-061767

(51) Int. Cl.
| | | |
|---|---|---|
| *G09G 5/34* | (2006.01) | |
| *G06F 3/0485* | (2013.01) | |
| *G06F 1/16* | (2006.01) | |
| *G06F 3/01* | (2006.01) | |

(52) U.S. Cl.
CPC .............. *G09G 5/34* (2013.01); *G06F 1/163* (2013.01); *G06F 3/017* (2013.01); *G06F 3/0485* (2013.01); *G09G 2340/0464* (2013.01); *G09G 2340/0492* (2013.01)

(58) Field of Classification Search
CPC ............................................ G09G 2340/0492
See application file for complete search history.

(56) References Cited

U.S. PATENT DOCUMENTS

| | | | | |
|---|---|---|---|---|
| 2007/0217701 A1* | 9/2007 | Liu | ........................ | G06K 9/38 382/234 |
| 2009/0002391 A1* | 1/2009 | Williamson | .......... | G06F 1/1626 345/619 |
| 2009/0070711 A1* | 3/2009 | Kwak | ................... | G06F 3/0485 715/829 |

(Continued)

FOREIGN PATENT DOCUMENTS

| | | |
|---|---|---|
| JP | 2009-181569 A | 8/2009 |
| JP | 2010-129092 A | 6/2010 |

(Continued)

*Primary Examiner* — Grace Q Li
(74) *Attorney, Agent, or Firm* — Chip Law Group

(57) ABSTRACT

Provided is a display control apparatus including a display control unit configured to control a display unit in a manner that content is displayed on a basis of a mode selected from a plurality of modes. The plurality of modes include at least a mode in which an object included in the content is displayed obliquely with respect to a direction of a side of a display area.

16 Claims, 14 Drawing Sheets

(56) References Cited

U.S. PATENT DOCUMENTS

| | | | |
|---|---|---|---|
| 2010/0066763 A1* | 3/2010 | MacDougall | G06F 1/1626 345/656 |
| 2011/0304561 A1* | 12/2011 | Kim | G06F 3/04886 345/173 |
| 2014/0007015 A1 | 1/2014 | Ekstrand et al. | |
| 2014/0181739 A1* | 6/2014 | Yoo | G06F 3/04883 715/800 |
| 2014/0263660 A1* | 9/2014 | Jiang | G06K 19/06112 235/491 |
| 2014/0304644 A1* | 10/2014 | Pereira | G06F 3/0485 715/784 |
| 2015/0022558 A1* | 1/2015 | Li | G09G 5/38 345/650 |

FOREIGN PATENT DOCUMENTS

| | | |
|---|---|---|
| JP | 2012-083801 A | 4/2012 |
| JP | 2013-008340 A | 1/2013 |

\* cited by examiner

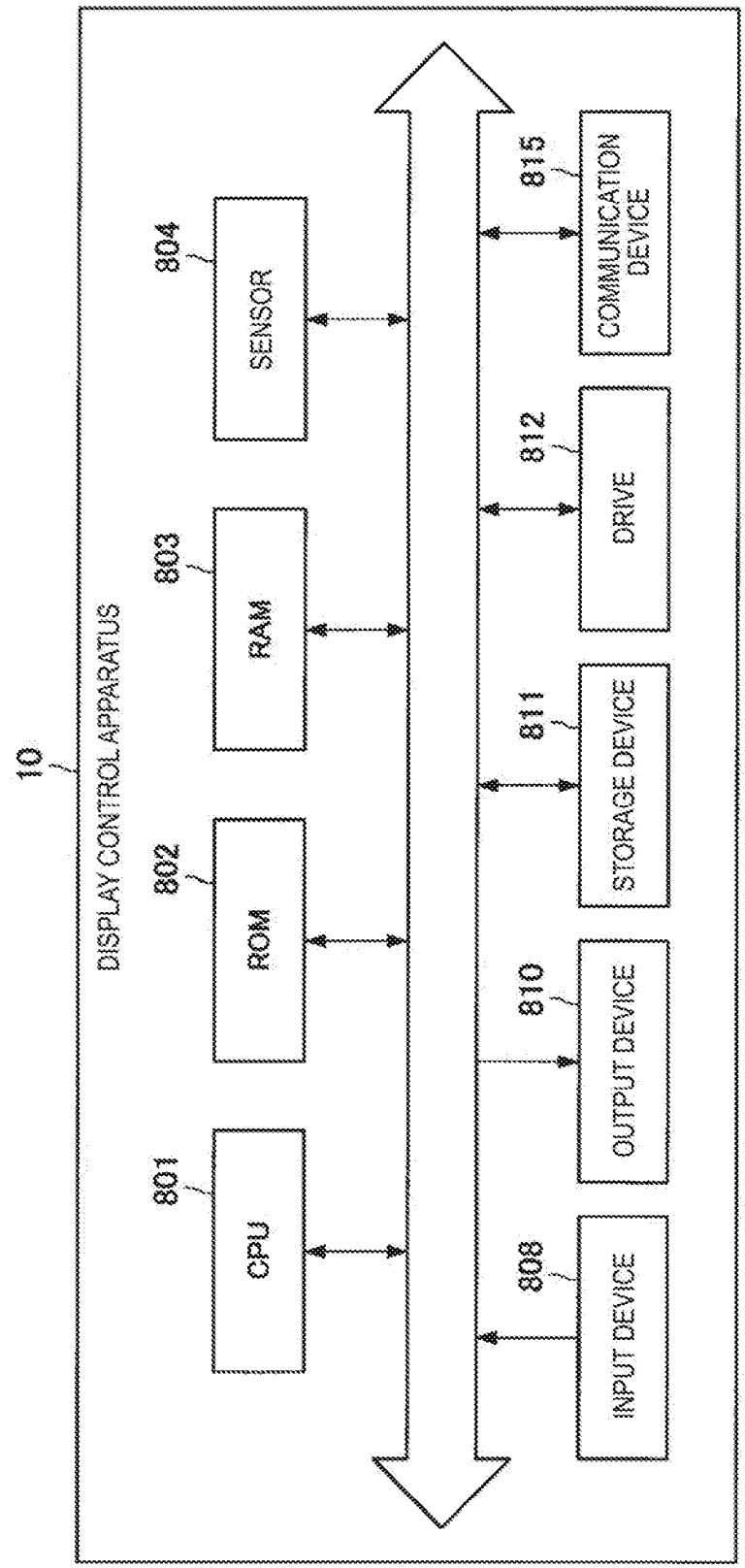

DISPLAY CONTROL APPARATUS AND DISPLAY CONTROL METHOD

CROSS REFERENCE TO RELATED APPLICATIONS

This application is a U.S. National Phase of International Patent Application No. PCT/JP2015/054266 filed on Feb. 17, 2015, which claims priority benefit of Japanese Patent Application No. 2014-061767 filed in the Japan Patent Office on Mar. 25, 2014. Each of the above-reference applications is hereby incorporated herein by reference in its entirety.

TECHNICAL FIELD

The present disclosure relates to a display control apparatus, a display control method, and a program.

BACKGROUND ART

Recently, there are disclosed technologies for controlling a display unit in a manner that content is displayed in a direction corresponding to an attitude of a terminal. For example, there is disclosed a technique for performing control in a manner that a direction of content is rendered vertically oriented or horizontally oriented depending on an attitude of a terminal (see, for example, Patent Literature 1).

CITATION LIST

Patent Literature

Patent Literature 1: JP 2010-129092A

SUMMARY OF INVENTION

Technical Problem

However, it is desirable to provide a technique for displaying content such that a user can view the content more easily.

Solution to Problem

According to an embodiment of the present disclosure, there is provided a display control apparatus including a display control unit configured to control a display unit in a manner that content is displayed on a basis of a mode selected from a plurality of modes. The plurality of modes include at least a mode in which an object included in the content is displayed obliquely with respect to a direction of a side of a display area.

According to an embodiment of the present disclosure, there is provided a display control method including controlling a display unit in a manner that content is displayed on a basis of a mode selected from a plurality of modes. The plurality of modes include at least a mode in which an object included in the content is displayed obliquely with respect to a direction of a side of a display area.

According to an embodiment of the present disclosure, there is provided a program for causing a computer to function as a display control apparatus, the display control apparatus including a display control unit configured to control a display unit in a manner that content is displayed on a basis of a mode selected from a plurality of modes. The plurality of modes include at least a mode in which an object included in the content is displayed obliquely with respect to a direction of a side of a display area.

Advantageous Effects of Invention

According to the present disclosure described above, it is possible to display content such that a user can view the content more easily. Note that the above effects are not necessarily limited thereto. In addition to or alternative to the above effects, any one of effects that are set forth in this Description or other effect that can be grasped from this Description may be achieved.

BRIEF DESCRIPTION OF DRAWINGS

FIG. 21 is a diagram showing an example of a hardware configuration of a display control apparatus.

DESCRIPTION OF EMBODIMENT(S)

Figure 1:
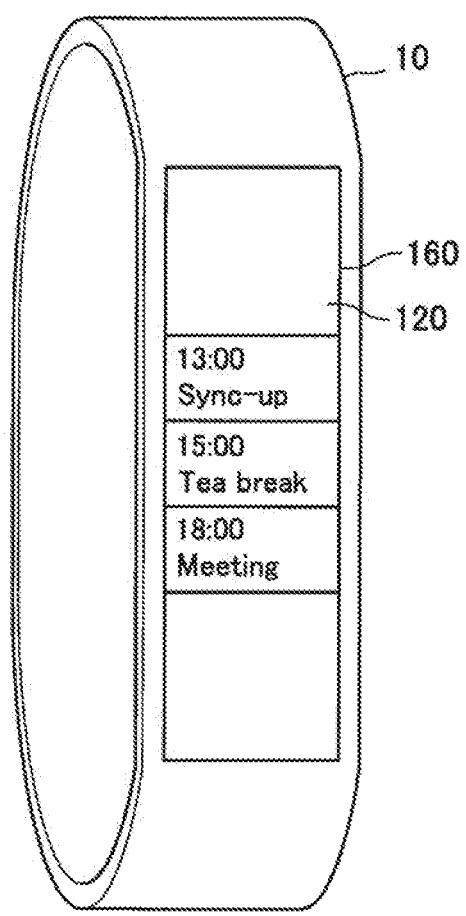
FIG. 1 is a diagram showing an example of appearance of a display control apparatus according to an embodiment of the present disclosure.

Hereinafter, preferred embodiments of the present disclosure will be described in detail with reference to the appended drawings. Note that, in this Description and the appended drawings, structural elements that have substantially the same function and structure are denoted with the same reference numerals, and repeated explanation of these structural elements is omitted.

Also, in this Description and the appended drawings, there are some cases where multiple structural elements that have substantially the same function and structure are distinguished from one another by being denoted with different alphabets or numbers after the same reference numerals. However, in the case where it is unnecessary to distinguish the multiple structural elements that have substantially the same function and structure from one another, the multiple structural elements are denoted with the same reference numeral only.

Note that description will be provided in the following order.

1. Overview of display control apparatus
2. Example of functional configuration of display control apparatus
3. Detailed functions of display control apparatus
4. Example of hardware configuration of display control apparatus
5. Conclusion <1. Overview of display control apparatus>

First, an overview of a display control apparatus 10 according to an embodiment of the present disclosure will be described. FIG. 1 is a diagram showing an example of appearance of the display control apparatus 10 according to an embodiment of the present disclosure. Referring to FIG. 1, the display control apparatus 10 includes an input unit 120 and a display unit 160. The input unit 120 detects a user operation and outputs the detected user operation to a control unit 110, as will be described below. Also, the display unit 160 displays content in accordance with control performed by the control unit 110. In the example shown in FIG. 1, the display unit 160 displays schedule information as an example of the content in a vertically oriented manner.

In FIG. 1, an example in which the display control apparatus 10 is configured of a wristband type display apparatus is shown, but the display control apparatus 10 may also be achieved by wearable display devices, such as a head mount display (HMD), other than the wristband type display device. Also, the display control apparatus 10 may be applied to a smartphone, a video camera, a digital camera, a personal digital assistant (PDA), a personal computer (PC), a mobile phone, a portable music reproduction device, a portable video processing device, a portable game machine, and the like.

Here, for example, there is disclosed a technique for controlling the display unit 160 in a manner that content is displayed in a direction corresponding to an attitude of the display control apparatus 10. For example, there is disclosed a technique for performing control in a manner that a direction of content is rendered vertically oriented or horizontally oriented depending on an attitude of the display control apparatus 10. However, it is desirable to provide a technique for displaying content such that a user can view the content more easily. Accordingly, this Description mainly proposes a technique for displaying content such that a user can view the content more easily.

In the above, the overview of the display control apparatus 10 according to the embodiment of the present disclosure has been described.

<2. Example of functional configuration of display control apparatus>

Figure 2:
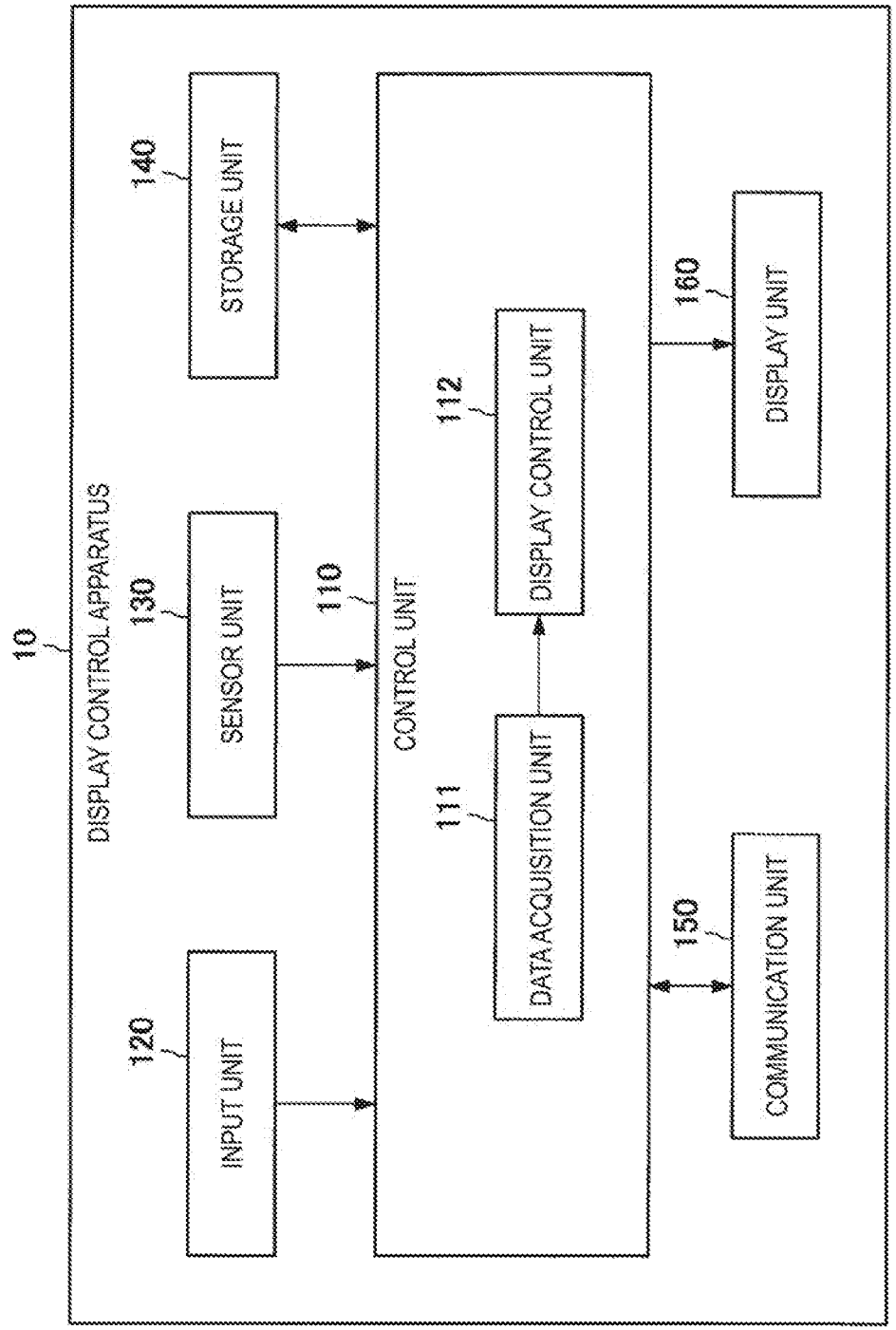
FIG. 2 is a diagram showing an example of functional configuration of a display control apparatus.

Subsequently, a functional configuration example of the display control apparatus 10 according to an embodiment of the present disclosure will be described. FIG. 2 is a diagram showing an example of functional configuration of the display control apparatus 10 according to an embodiment of the present disclosure. As shown in FIG. 2, the display control apparatus 10 includes a control unit 110, an input unit 120, a sensor unit 130, a storage unit 140, a communication unit 150, and a display unit 160.

The control unit 110 exhibits various functions of the control unit 110 by executing a program stored in the storage unit 140 or other storage medium. As shown in FIG. 2, the control unit 110 includes functional blocks, such as a data acquisition unit 111 and a display control unit 112. The data acquisition unit 111 reads content. The content may be read from the storage unit 140, or may be read from another device through the communication unit 150. The display control unit 112 controls the display unit 160 in a manner that the content read by the data acquisition unit 111 is displayed. Functions of these functional blocks will be described in detail later.

The control unit 110 may include a processor, such as a central processing unit (CPU), a graphics processing unit (GPU), a digital signal processor (DSP), or a system on chip (SoC). Also, the control unit 110 may include an electronic circuit for performing a variety of arithmetic processing.

The input unit 120 detects a user operation and outputs the detected user operation to the control unit 110. For example, in the case where the input unit 120 includes a touch panel, the user operation may correspond to an operation of tapping the touch panel. The touch panel may detect a contact of an operating object or may detect proximity of the operating object. However, the input unit 120 may also include hardware other than the touch panel. For example, in the case where the input unit 120 includes an imaging device and a line of sight of the user is detected from an image captured by the imaging device, the user operation corresponds to an operation of putting the line of sight. In the example shown in FIG. 2, the input unit 120 is integrated with the display control apparatus 10, but the input unit 120 may also be provided separately from the display control apparatus 10.

The sensor unit 130 acquires sensor data. For example, the sensor unit 130 includes a triaxial acceleration sensor. The triaxial acceleration sensor measures a gravitational acceleration applied to the display unit 160 and generates sensor data (acceleration data) that three-dimensionally represents the magnitude and direction of the gravitational acceleration. Also, the sensor unit 130 may include a geomagnetic sensor. The geomagnetic sensor generates sensor data (geomagnetic data) representing a direction of geomagnetism in a coordinate system of the display unit 160. Also, the sensor unit 130 may include a gyro sensor. The gyro sensor measures an angular velocity of the display unit 160. In the example shown in FIG. 2, the sensor unit 130 is integrated with the display control apparatus 10, but the sensor unit 130 may also be provided separately from the display control apparatus 10.

The storage unit 140 stores a program for causing the control unit 110 to operate by using a storage medium such as semiconductor memory or a hard disk. Also, for example, the storage unit 140 can store various data to be used by the program. In the example shown in FIG. 2, the storage unit 140 is integrated with the display control apparatus 10, but the storage unit 140 may also be provided separately from the display control apparatus 10.

The communication unit 150 can perform communication with other apparatus (for example, another display control apparatus 10). For example, in the case where the communication unit 150 performs communication with the other display control apparatus 10, the communication unit 150 can perform communication through a network. The mode of the communication performed by the communication unit 150 is not particularly limited, and may be wireless communication or wired communication. In the example shown in FIG. 2, the communication unit 150 is integrated with the display control apparatus 10, but the communication unit 150 may also be provided separately from the display control apparatus 10.

The display unit 160 displays a variety of information under the control of the control unit 110. The display unit 160 may be achieved by a liquid crystal display (LCD), may be achieved by an organic electro-luminescence (EL) display, may be achieved by a projector, or may be achieved by a hologram display. In the example shown in FIG. 2, the display unit 160 is integrated with the display control apparatus 10, but the display unit 160 may also be provided separately from the display control apparatus 10. For example, a display device connected to the display control apparatus 10 via wire or radio may be handled as the display unit 160.

In the above, the example of functional configuration of the display control apparatus 10 according to an embodiment of the present disclosure has been described.

<3. Detailed functions of display control apparatus>

Subsequently, functions of the display control apparatus 10 according to an embodiment of the present disclosure will be described in detail. In the embodiment of the present disclosure, the display control unit 112 controls the display unit 160 such that content is displayed on the basis of a mode selected from among multiple modes. To be specific, the display control unit 112 generates display control information for displaying content on the display unit 160 and outputs the generated display control information to the display unit 160. In this way, the display control unit 112 can control the display unit 160 such that the relevant content is displayed on the display unit 160. The selection of the mode may be performed by the display control unit 112, and the detail of the selection of the mode will be described later.

The multiple modes include at least a mode in which an object included in content is displayed obliquely with respect to a direction of a side of a display area. According to such a structure, it becomes possible to display content such that a user can view the content more easily. For example, in the case where the display control apparatus 10 is configured of a wristband type display apparatus, since it is more likely that the content is viewed obliquely with respect to the direction of the side of the display area, it becomes possible to display the content such that the user can view the content more easily.

Figure 3:
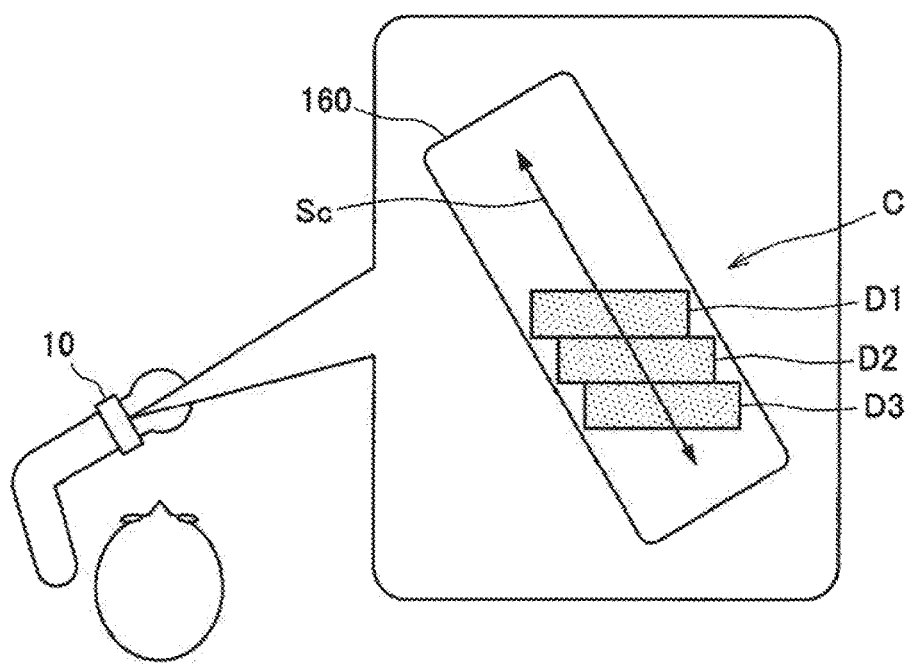
FIG. 3 is a diagram illustrating an individual rotation mode.

For example, the multiple modes may include a mode in which an object that is displayed obliquely with respect to a direction of a side includes multiple divided objects and the multiple divided objects each have the center of rotation, the rotation being carried out from a substantially parallel state to an oblique state with respect to the direction of the side of the display area (hereinafter, also referred to as "individual rotation mode"). Here, the individual rotation mode will be described specifically. FIG. 3 is a diagram illustrating the individual rotation mode. Referring to FIG. 3, content C includes divided objects D1 to D3. Although an example in which the content C includes three divided objects is shown here, the number of divided objects included in the content C is not particularly limited.

Further, referring to FIG. 3, in the individual rotation mode, the display control unit 112 rotates the divided objects D1 to D3 such that the states of the divided objects D1 to D3 are changed from substantially parallel states to oblique states with respect to the direction of a side of the display area. In addition, the centers of rotation of the divided objects D1 to D3 are present for the respective divided objects. The degrees of gradient of the divided objects D1 to D3 may be changed depending on the gradient of the display area, or may be set beforehand. Here, the substantially parallel state may be the parallel state, and the substantially parallel state may include a state in which a deviation from the parallel state is within a predetermined range, the state including the parallel state.

The gradient of the display area may be calculated based on at least one of an image captured by an imaging device and a result measured by an acceleration sensor. For example, the display control unit 112 may specify a gravitational direction from the result measured by the acceleration sensor and calculate the gradient of the display area on the basis of the gravitational direction. Also, the display control unit 112 may detect a face region or an eye region from the image captured by the imaging device and calculate the gradient of the display area on the basis of the direction of the face region or the eye region.

Further, each of the divided objects D1 to D3 may be any object. For example, in the case where the content C includes a list (for example, schedule information), each of the divided objects D1 to D3 may be data (for example, individual schedule data) included in the list.

In the individual rotation mode, the display control unit 112 may be capable of scrolling the content C in accordance with a scroll operation. The scroll operation is not particularly limited, and may be a drag operation on a touch panel. Further, in the individual rotation mode, a scroll direction of the divided objects D1 to D3 may be any one of a direction of one side of the display area and a direction of another side of the display area. In the example shown in FIG. 3, although it is shown that the long-side direction of the display area is represented by a scroll direction Sc, the short-side direction of the display area may be the scroll direction. Further, the content C may be scrolled while the positional relationship of divided objects D1 to D3 is maintained.

Figure 4:
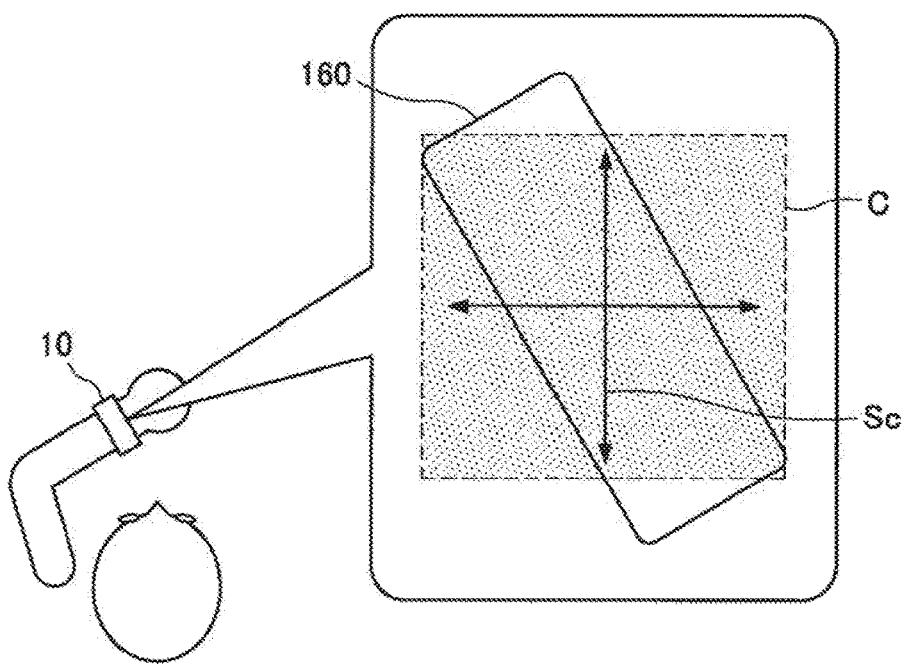
FIG. 4 is a diagram illustrating a total rotation mode.

For example, the multiple modes may include a mode in which the center of rotation of whole content is present (hereinafter, also referred to as "total rotation mode"). Here, the total rotation mode will be described specifically. FIG. 4 is a diagram illustrating the total rotation mode. Referring to FIG. 4, in the total rotation mode, the display control unit 112 rotates the content C such that the state of the content C is changed from a substantially parallel state to an oblique state with respect to the direction of a side of the display area. In addition, the center of rotation of the whole content C is present. The degree of gradient of the content C may be changed depending on the gradient of the display area, or may be set beforehand.

The type of content C to be used in the total rotation mode is not limited, and may also be content that is difficult to be divided (for example, image).

Also in the total rotation mode, the display control unit 112 may be capable of scrolling the content C in accordance with a scroll operation. The scroll operation is not particularly limited, and may be a drag operation on a touch panel. Further, in the total rotation mode, a scroll direction of the content C may be any one of a direction of one side of the content C and a direction of another side of the content C. In the example shown in FIG. 4, directions (vertical direction and horizontal direction) of the sides of the content C are each represented by a scroll direction Sc.

Figure 5:
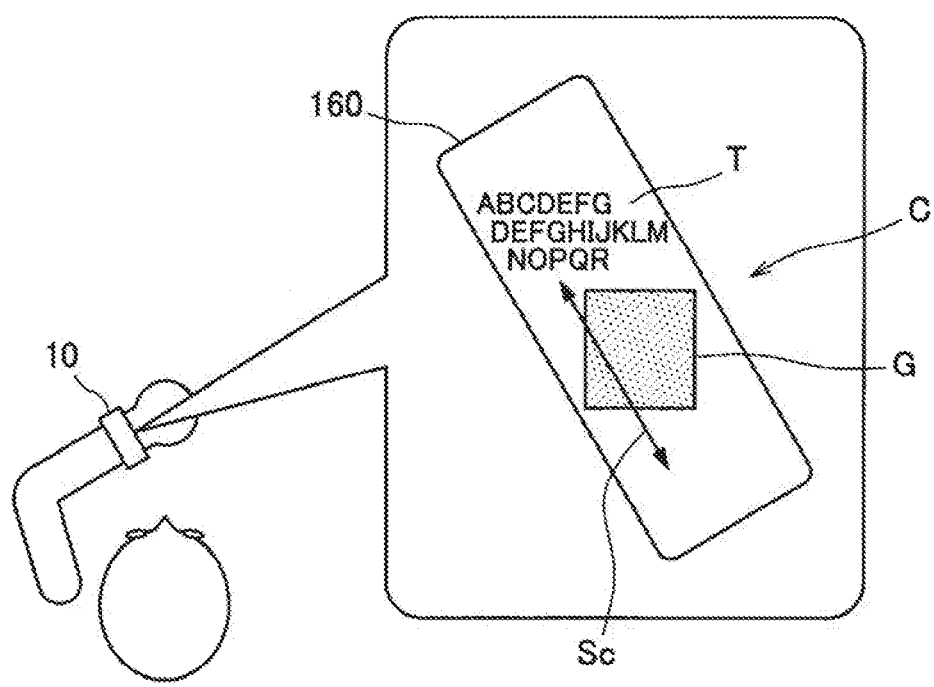
FIG. 5 is a diagram for supplementary explanation of the individual rotation mode.

Note that, although the example in which the content including a list as the content used in the individual rotation mode has been described above, other content may also be used in the individual rotation mode. FIG. 5 is a diagram for supplementary explanation of the individual rotation mode. Referring to FIG. 5, web content including text data T and an image G is displayed as an example of the content C on the display unit 160. As shown in FIG. 5, the center of rotation may be present in each of the respective lines of text data T and the image G. Accordingly, in the case where the text data T is included in the content C, the respective lines of the text data T and the image G may each be handled as the divided object.

Here, let us assume the case where, as in the individual rotation mode, the scroll direction is the direction of a side of the display area. In this case, the scroll direction and the direction of the drag operation may be identical to or different from each other. In the case where the scroll direction and the direction of the drag operation are identical to each other, a movement distance of a finger in the drag operation (hereinafter, also simply referred to as "finger movement distance") and a movement distance of the content C (also simply referred to as "content movement distance") may be identical to each other. On the other hand, in the case where the scroll direction and the direction of the drag operation are different from each other, the finger movement distance and the content movement distance may not necessarily be identical to each other. Note that the finger is merely an example of the operating object, and an operating object other than the finger may be used to perform the drag operation.

Figure 6:
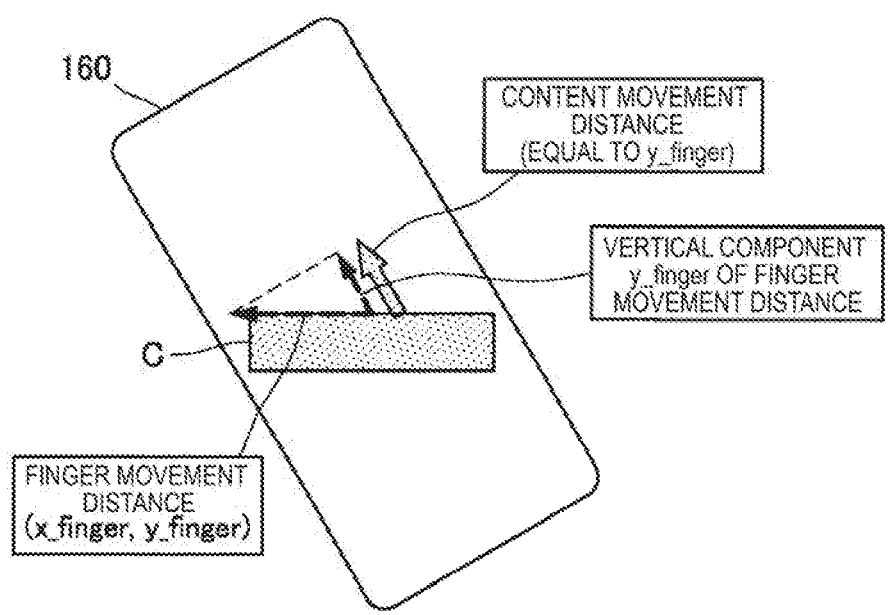
FIG. 6 is a diagram illustrating a general example of moving content in a case where a scroll direction and a direction of a drag operation are different from each other.

First, the case where the scroll direction and the direction of the drag operation are different from each other will be described. FIG. 6 is a diagram illustrating a general example of moving content in the case in which the scroll direction and the direction of the drag operation are different from each other. Referring to FIG. 6, the finger movement distance is represented by (x_finger, y_finger). Represented by x_finger is a component in the short-side direction of the display area in the finger movement distance, and represented by y_finger is a component in the long-side direction of the display area in the finger movement distance. Here, in the case where the scroll direction is the long-side direction of the display area, the content movement distance may be equal to y_finger corresponding to the component in the long-side direction of the display area in the finger movement distance.

Figure 7:
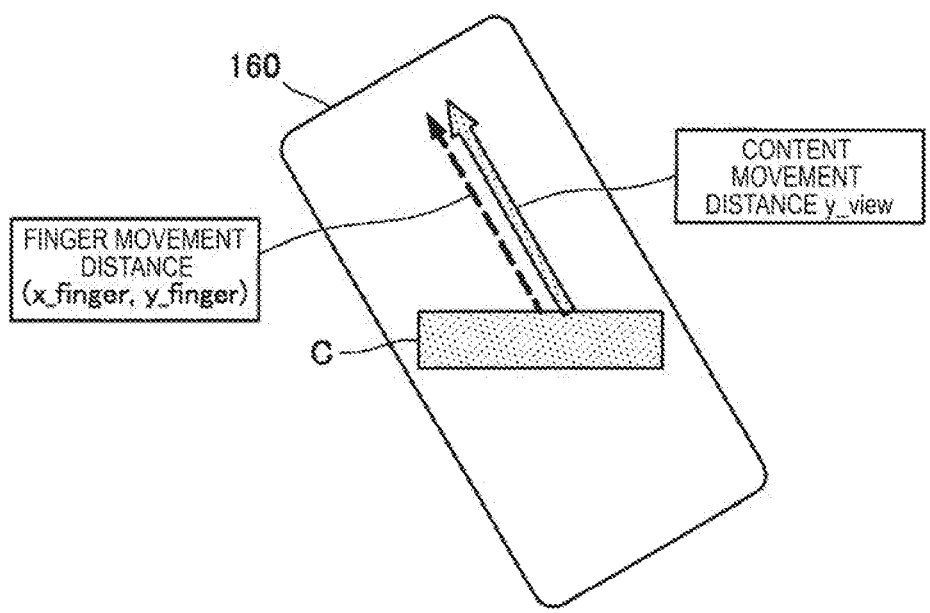
FIG. 7 is a diagram illustrating a general example of moving content in a case where a scroll direction and a direction of a drag operation are identical to each other.

Subsequently, the case where the scroll direction and the direction of the drag operation are identical to each other will be described. FIG. 7 is a diagram illustrating a general example of moving content in the case where the scroll direction and the direction of the drag operation are identical to each other. In the same manner as the example shown in FIG. 6, in the case where the scroll direction is the long-side direction of the display area, a content movement distance y_view may be y_finger corresponding to the component in the long-side direction of the display area in the finger movement distance. However, in the case where the scroll direction and the direction of the drag operation are identical to each other, y_finger is equal to the finger movement distance. Accordingly, as shown in FIG. 7, in the case where the scroll direction and the direction of the drag operation are identical to each other, the content movement distance may be the finger movement distance itself.

As shown in FIG. 6 and FIG. 7, the content movement distance may be the component in the scroll direction of the finger movement distance. However, with decrease in the component in the scroll direction of the finger movement distance, the content movement distance decreases, and the movement speed of the content decreases. Accordingly, in the individual rotation mode, in the case where the scroll direction and the direction of the drag operation are different from each other, the display control unit 112 may move the content in the scroll direction such that the content movement distance is larger than the scroll direction component of the finger movement distance. According to such a structure, the decrease in the movement speed of the content can be suppressed.

Figure 8:
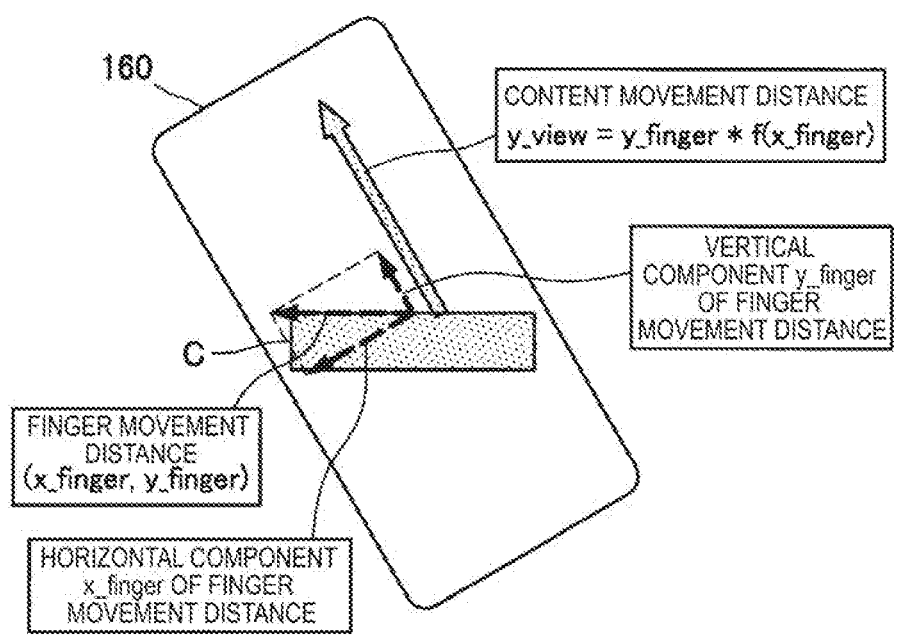
FIG. 8 is a diagram illustrating an example of content movement in the individual rotation mode.

Specific examples will be described with reference to FIG. 8 and FIG. 9. FIG. 8 is a diagram illustrating an example of content movement in the individual rotation mode. As shown in FIG. 8, in the case where the scroll direction is the long-side direction of the display area, the content movement distance y_view may be a result obtained by multiplying y_finger corresponding to the component of the finger movement distance in the long-side direction of the display area by f(x_finger) which is obtained by converting x_finger corresponding to the component of the finger movement distance in the short-side direction of the display area using a predetermined function f. The function f is not particularly limited, and an example of the function f will be described.

Figure 9:
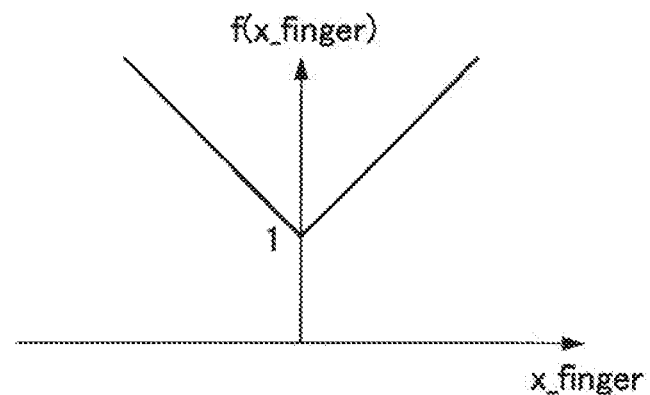
FIG. 9 is a diagram illustrating a function used for calculating a movement distance of content in the individual rotation mode.

FIG. 9 is a diagram illustrating the function f used for calculating the content movement distance in the individual rotation mode. As shown in FIG. 9, the function f may be a function which outputs 1 in the case where 0 is input as x_finger corresponding to the component in the short-side direction of the display area. In this way, in the case where x_finger corresponding to the component in the short-side direction of the display area is 0, since the result obtained by multiplying y_finger by f(0)(=1) is y_finger, y_finger is calculated as the content movement distance y_view itself. Accordingly, in the case where the scroll direction and the direction of the drag operation are the same as each other, the content movement distance is the finger movement distance itself, and hence, it is expected that the scrolling of the content is performed naturally.

Further, as shown in FIG. 9, the function f may be a function that outputs larger value as an absolute value of x_finger corresponding to the component in the short-side direction of the display area increases. In this way, when a user performs a drag operation in a manner that x_finger corresponding to the component in the short-side direction of the display area becomes large, the result obtained by multiplying y_finger by f(x_finger) is calculated to be large. Therefore, even when the scroll direction component of the finger movement distance is the same, the content movement distance increases with increase in the finger movement distance, and hence, the decrease in the movement speed of the content can be suppressed naturally.

As described above, in each of the individual rotation mode and the total rotation mode, the content is displayed obliquely with respect to the direction of a side of the display area. Accordingly, there may be a case where a space is generated between the content that is displayed obliquely with respect to the direction of the side of the display area and multiple adjacent sides of the display area. In that case, the display control unit 112 may display a predetermined object in the space between the content that is displayed obliquely with respect to the direction of the side of the display area and the multiple adjacent sides of the display area. In this way, the space can be utilized effectively. The object to be displayed in the space is not particularly limited, and may be any item.

Figure 10:
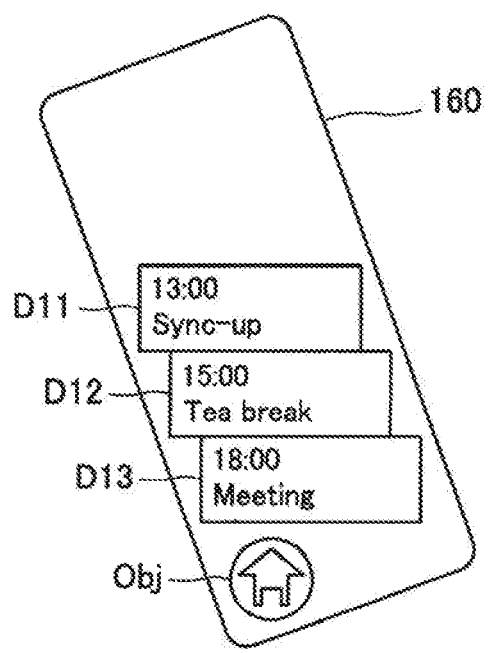
FIG. 10 is a diagram showing an example of displaying a predetermined object in a space.

For example, an object to be displayed in such a space may be a global user interface (UI) item. The global UI item may be a home button for returning to a home screen, a voice recognition button for starting voice recognition, and a screen off button for turning off the screen. FIG. 10 is a diagram showing an example of displaying a predetermined object in the space. FIG. 10 shows an example in which the display control unit 112 displays an object Obj, which is a home button, in the space between divided objects D11 to D13 and multiple adjacent sides of the display area.

Figure 11:
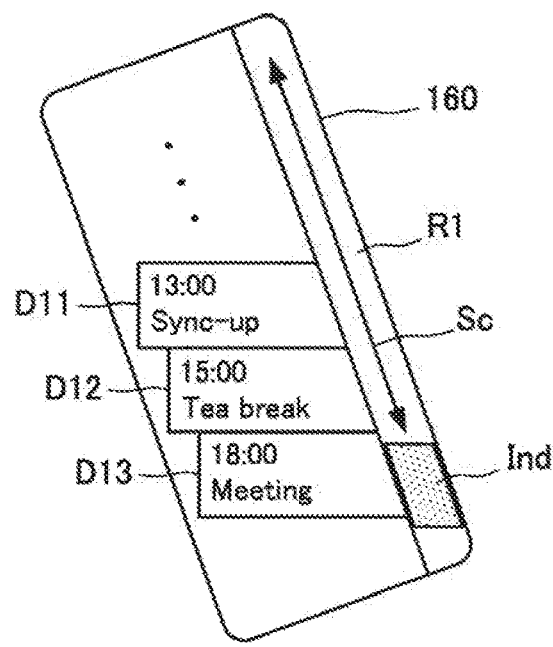
FIG. 11 is a diagram showing an example of displaying an indicator which shows a current display position.

Further, as described above, in the individual rotation mode, the scroll direction of the divided object may be any one of a direction of one side of the display area and a direction of another side of the display area. In this case, the display control unit 112 may display an indicator showing a current display position on the basis of the scroll direction. FIG. 11 is a diagram showing an example of displaying an indicator which shows a current display position. Referring to FIG. 11, divided objects D11 to D13 are currently displayed, and an indicator Ind, which shows the position of the divided objects D11 to D13 in the whole content, is displayed.

The indicator Ind is capable of being moved along a scroll direction Sc, and the display control unit 112 may perform predetermined display on a movable region R1 of the indicator Ind. The shape of the indicator Ind is not particularly limited, and may be, as shown in FIG. 11, a rectangle that has been deformed depending on the gradient of the display area. Further, in the example shown in FIG. 11, although the movable region R1 of the indicator Ind is placed at the right-hand side of the display area, the position of the movable region R1 of the indicator Ind may be any as long as the movable region R1 is placed along the scroll direction Sc.

As described above, the content may be scrollable, and the content may have an end. When the end of the content reaches the display area, it is good to allow a user to grasp the fact that the scrolling of the content is limited. For example, when the end of the content reaches the display area, the display control unit 112 may display a predetermined object in a space generated between the end of the content and multiple adjacent sides of the display area. In this way, the user can easily grasp the fact that the end of the content has reached the display area by viewing the thus displayed object.

Figure 12:
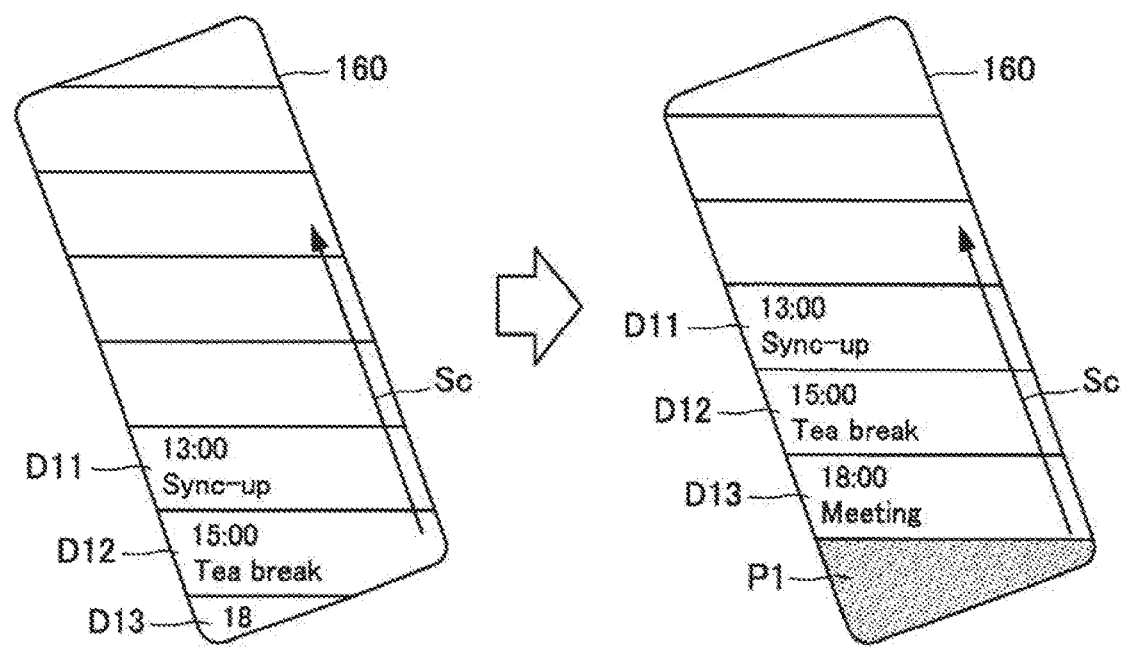
FIG. 12 is a diagram showing a display example of when an end of content reaches a display area in the individual rotation mode.

An example of the case where the individual rotation mode is selected will be described. FIG. 12 is a diagram showing a display example of when an end of content reaches the display area in the individual rotation mode. In the example shown in FIG. 12, as a result of performing scrolling of the content in the scroll direction Sc, the lower end of the divided object D13, which corresponds to the bottom end of the list, reaches the display area. In this case, the display control unit 112 may display an object P1 in a space generated between the lower end of the divided object D13 and multiple adjacent sides of the display area. Note that FIG. 12 shows the example in which the black filled object P1 is displayed in the space, however, the object to be displayed in the space is not limited to such an example, and may be a wallpaper or may be a display of a lower layer.

Figure 13:
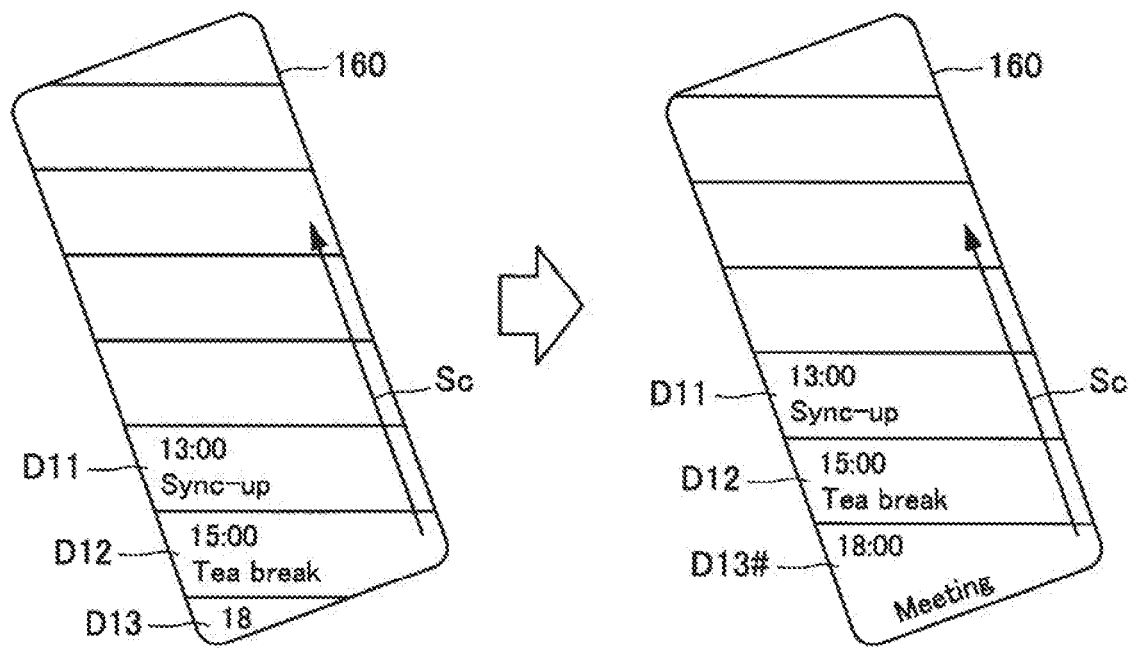
FIG. 13 is a diagram showing another display example of when the end of content reaches the display area in the individual rotation mode.

Further, when the divided object of the top end or the bottom end reaches the display area, the display control unit 112 may make the display mode of the divided object different from the display mode of each of other divided objects. An example of when the divided object of the bottom end reaches the display area will be described. FIG. 13 is a diagram showing another display example of when the end of content reaches the display area in the individual rotation mode. In the example shown in FIG. 13, as a result of performing scrolling of the content in the scroll direction Sc, the lower end of a divided object D13#, which corresponds to the bottom end of the list, reaches the display area. In this case, the display control unit 112 may make the display mode of the divided object D3# different from the display mode of each of the other divided objects D11 and D12. How to make the display mode of the divided object D3# different from the display mode of each of the other divided objects D11 and D12 is not particularly limited.

In the example shown in FIG. 13, the display control unit 112 makes the shape of the divided object D13# different from the shape of each of the divided objects D11 and D12. In this way, the divided object D13# whose shape is different from the shape of each of the other divided objects is displayed, and hence, no space is generated, so the display area may be used effectively. Alternatively, the display control unit 112 may make the color of the divided object D13# different from the color of each of the divided objects D11 and D12. Further, the display control unit 112 may make the size of the divided object D13# different from the size of each of the divided objects D11 and D12.

Heretofore, there has been described the example in which the display mode of the divided object is made different from the display mode of each of other divided objects when the divided object of the top end or the bottom end reaches the display area. However, the display mode of the divided object may be changed at other timings. For example, since the shape which makes it easier to view the divided object may change depending on the gradient of the display area, the display control unit 112 may change the shape of the divided object depending on the gradient of the display area. The divided object may be changed in any way, and, for example, the display control unit 112 may change an aspect ratio of the divided object when the gradient of the display area exceeds a threshold.

Figure 14:
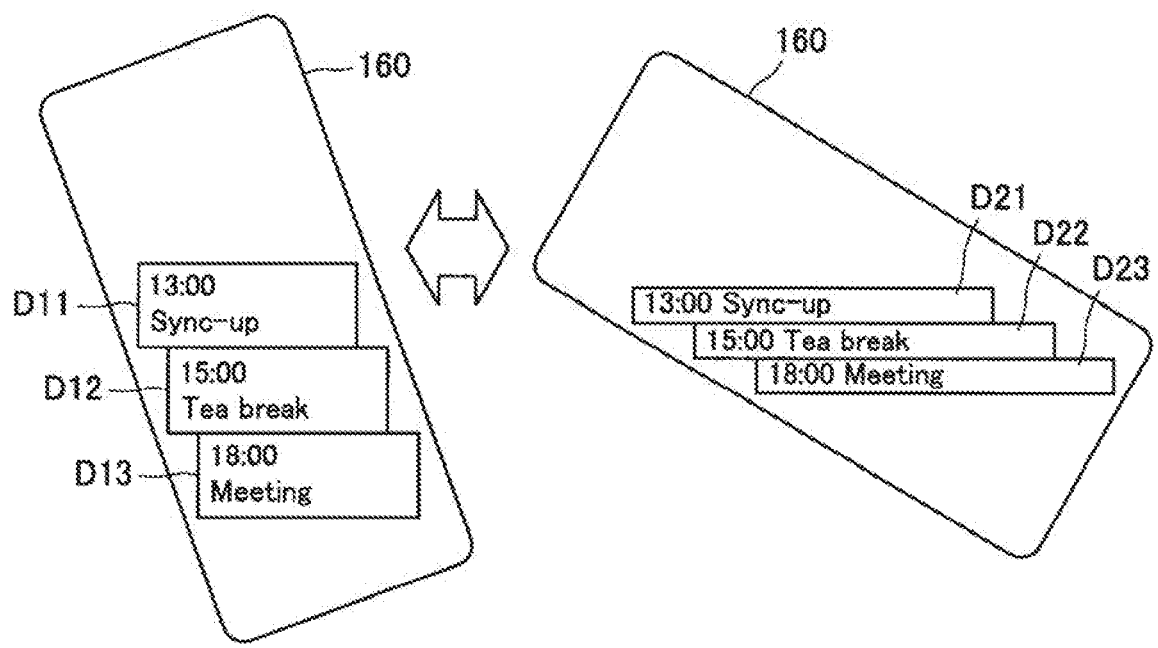
FIG. 14 is a diagram showing an example of a relationship between a gradient of the display area and shapes of divided objects.

FIG. 14 is a diagram showing an example of a relationship between a gradient of the display area and shapes of divided objects. Referring to FIG. 14, the divided objects D11 to D13 each have a horizontal character string. In this case, when the gradient in the long-side direction of the display area exceeds a threshold, the number of characters fitted into one line is larger than the number of characters before the gradient in the long-side direction of the display area exceeds the threshold. Accordingly, the display control unit 112 may decrease the number of lines of character string included in each of the divided objects D11 to D13. In this case, the display control unit 112 may increase the horizontal length of each of the divided objects D11 to D13. FIG. 14 shows divided objects D21 to D23 each having an increased horizontal length.

Further, as described above, since the divided object may rotate depending on the gradient of the display area, the gradient of the divided object with respect to the gradient of the display area may change. Accordingly, the display control unit 112 may change the scroll direction of the divided object depending on the gradient of the display area.

To be specific, the display control unit 112 may rotate by a predetermined degree the scroll direction of the divided object when the gradient of the display area exceeds a threshold.

Figure 15:
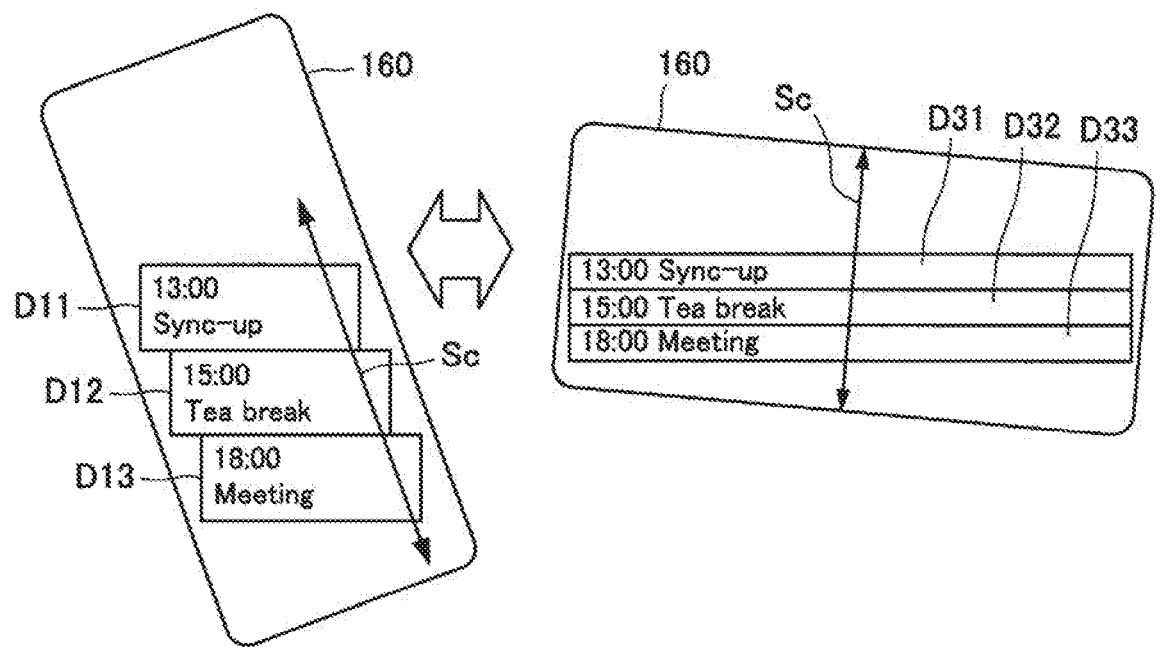
FIG. 15 is a diagram showing an example of a relationship between a gradient of the display area and a scroll direction of divided objects.

FIG. 15 is a diagram showing an example of a relationship between a gradient of a display area and a scroll direction of divided objects. In the example shown in FIG. 15, when the gradient in the long-side direction of the display area exceeds a threshold, the display control unit 112 rotates a scroll direction Sc by 90 degrees, and as a result thereof, the scroll direction Sc is changed from the long-side direction of the display area to the short-side direction of the display area. Note that, in the same manner as the example shown in FIG. 14, the display control unit 112 may decrease the number of lines of character string included in each of the divided objects D11 to D13. In this case, the display control unit 112 may increase the horizontal length of each of the divided objects D11 to D13. FIG. 15 shows divided objects D31 to D33 each having an increased horizontal length.

Further, a diagonal line of the display area is the longest line among the lines that fit in the display area. Accordingly, a divided object to be displayed in an area including the diagonal line of the display area may be determined by the display control unit 112. To be specific, the display control unit 112 may determine the divided object to be displayed in the area including the diagonal line of the display area depending on information associated with the divided object. The information associated with the divided object is not limited. For example, the information associated with the divided object may be a degree of priority. In this case, the display control unit 112 may determine the divided object associated with the highest degree of priority as the divided object to be displayed in the area including the diagonal line of the display area.

Alternatively, the information associated with the divided object may be a flag indicating whether or not to be displayed in the area including the diagonal line of the display area. In this case, the display control unit 112 may determine the divided object associated with the indication to be displayed in the area including the diagonal line of the display area as the divided object to be displayed in the area including the diagonal line of the display area. Further, the information associated with the divided object may be a type of the divided object. In this case, the display control unit 112 may determine the divided object associated with a predetermined type as the divided object to be displayed in the area including the diagonal line of the display area.

Figure 16:
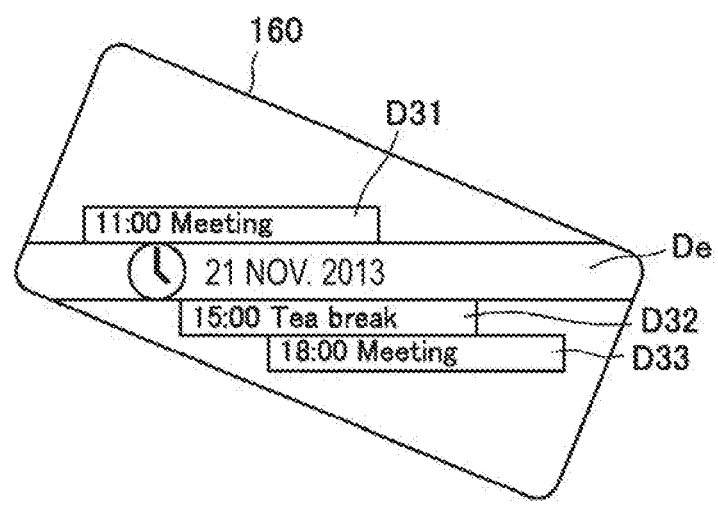
FIG. 16 is a diagram illustrating an example of divided objects displayed in an area including a diagonal line of the display area.

FIG. 16 is a diagram illustrating an example of divided objects displayed in an area including a diagonal line of a display area. Referring to FIG. 16, divided objects D31 to D33 are each schedule data and a divided object De is a current date. In this case, the display control unit 112 determine the divided object De as the divided object to be displayed in the area including the diagonal line of the display area, depending on information associated with each of the divided objects D31 to D33 and the divided object De.

Figure 17:
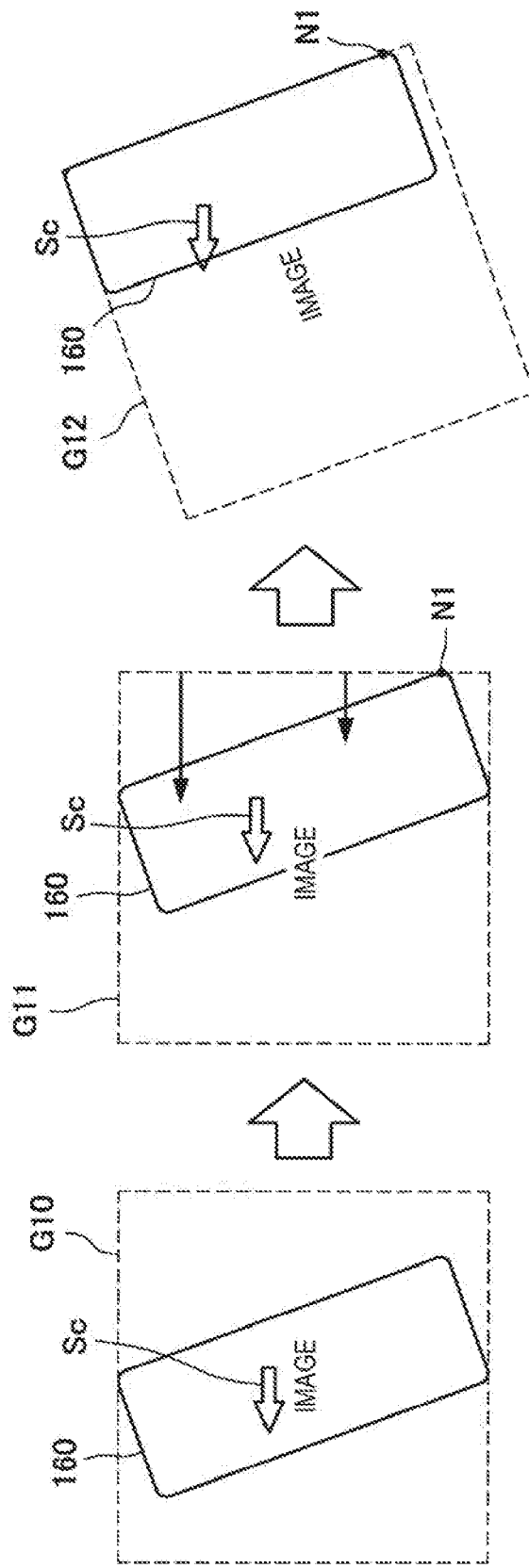
FIG. 17 is a diagram showing a display example of when an end of content reaches the display area in the total rotation mode.

As described above, when an end of content reaches the display area, it is good to allow a user to grasp the fact that the scrolling of the content is limited. Hereinafter, an example of the case where the total rotation mode is selected will be described. For example, in the case where the total rotation mode is selected, the display control unit 112 may rotate the content when the end of the content reaches the display area. FIG. 17 is a diagram showing a display example of when an end of content reaches a display area in the total rotation mode. Referring to FIG. 17, the display control unit 112 displays an image G10 as an example of the content.

In such a state, if the display control unit 112 causes the image G10 to be scrolled in a scroll direction Sc, an end of the image G10 reaches the display area. In the example shown in FIG. 17, as a result of the image G10 being scrolled in the scroll direction Sc, the right end of an image G11 reaches a corner N1 of the display area. In this case, the display control unit 112 may rotate the image G11. In the example shown in FIG. 17, an image G12 is displayed as a result of rotating, using the corner N1 of the display area as a reference, the image G11 until the direction of a side of the image G11 and the direction of a side of the display area correspond with each other. The thus rotated image G12 is displayed, and hence, no space is generated, so the display area may be used effectively.

Figure 18:
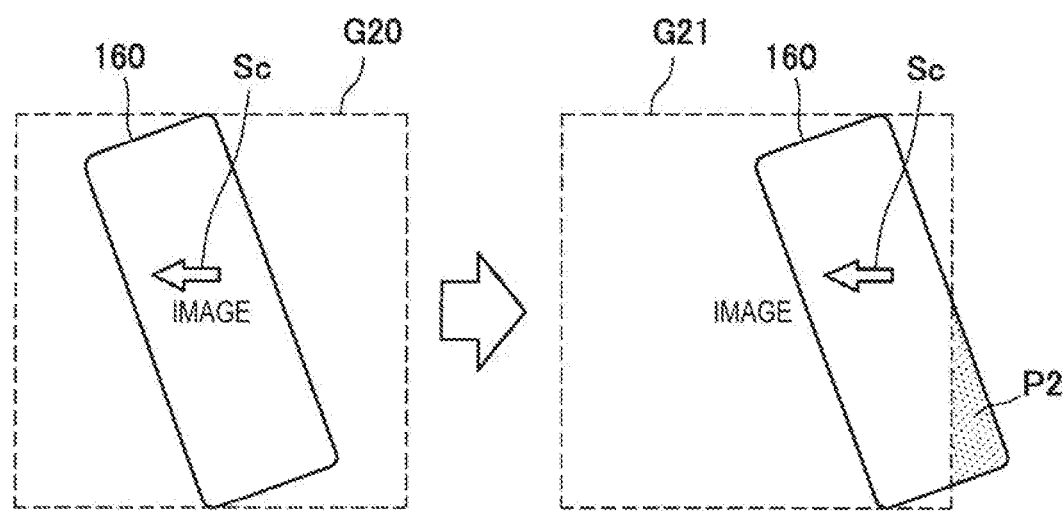
FIG. 18 is a diagram showing another display example of when the end of content reaches the display area in the total rotation mode.

Further, for example, in the case where the total rotation mode is selected, when an end of content reaches the display area, the display control unit 112 may display a predetermined object in a space generated between the end of the content and multiple adjacent sides of the display area. FIG. 18 is a diagram showing another display example of when the end of the content reaches the display area in the total rotation mode. Referring to FIG. 18, the display control unit 112 displays an image G20 as an example of the content.

In such a state, if the display control unit 112 causes the image G20 to be scrolled in a scroll direction Sc, an end of the image G20 reaches the display area. In the example shown in FIG. 18, as a result of the image G20 being scrolled in the scroll direction Sc, the right end of an image G21 reaches the display area. In this case, the display control unit 112 may display a predetermined object in the space generated between the end of the image G21 and multiple adjacent sides of the display area.

In the example shown in FIG. 18, an object P2 may be displayed in the space generated between the right end of the image G21, and a long side and a short side, which are adjacent to each other, of the display area. Note that FIG. 18 shows the example in which the black filled object P2 is displayed in the space, however, the object to be displayed in the space is not limited to such an example, and may be a wallpaper or may be a display of a lower layer.

Heretofore, the individual rotation mode and the total rotation mode have been described. The display control unit 112 may determine which of the modes should be used for the operation. That is, the display control unit 112 may select either the individual rotation mode or the total rotation mode. Which of the individual rotation mode and the total rotation mode should be selected under what situation is not particularly limited. However, as described above, since each line of text data may be handled as a divided object, the display control unit 112 may select the individual rotation mode or the total rotation mode depending on the amount of text data included in the content.

To be more specific, it is assumed that the larger the proportion occupied by the text data in the whole content, the more appropriate it is to select the individual rotation mode as the operation mode. Therefore, the display control unit 112 may select the individual rotation mode when the proportion occupied by the text data in the whole content exceeds a threshold. On the other hand, when the proportion occupied by the text data in the whole content is less than the threshold, the display control unit 112 may select the total rotation mode. When the proportion occupied by the text data in the whole content is equal to the threshold, either mode may be selected.

Further, as described above, since each piece of data included in a list is also handled as a divided object, the display control unit 112 may select the individual rotation mode when the list is included in the content. To be more specific, it is assumed that the larger the proportion occupied by the list in the whole content, the more appropriate it is to select the individual rotation mode as the operation mode. Therefore, the display control unit 112 may select the individual rotation mode when the proportion occupied by the list in the whole content exceeds a threshold. On the other hand, when the proportion occupied by the list in the whole content is less than the threshold, the display control unit 112 may select the total rotation mode. When the proportion occupied by the list in the whole content is equal to the threshold, either mode may be selected.

Note that the display control unit 112 may select either the individual rotation mode or the total rotation mode on the basis of a flag associated with content. In more detail, when the content is associated with the indication that the individual rotation mode should be selected, the display control unit 112 may select the individual rotation mode. On the other hand, in the case where the content is associated with the indication that the total rotation mode should be selected, the display control unit 112 may select the total rotation mode.

Figure 19:
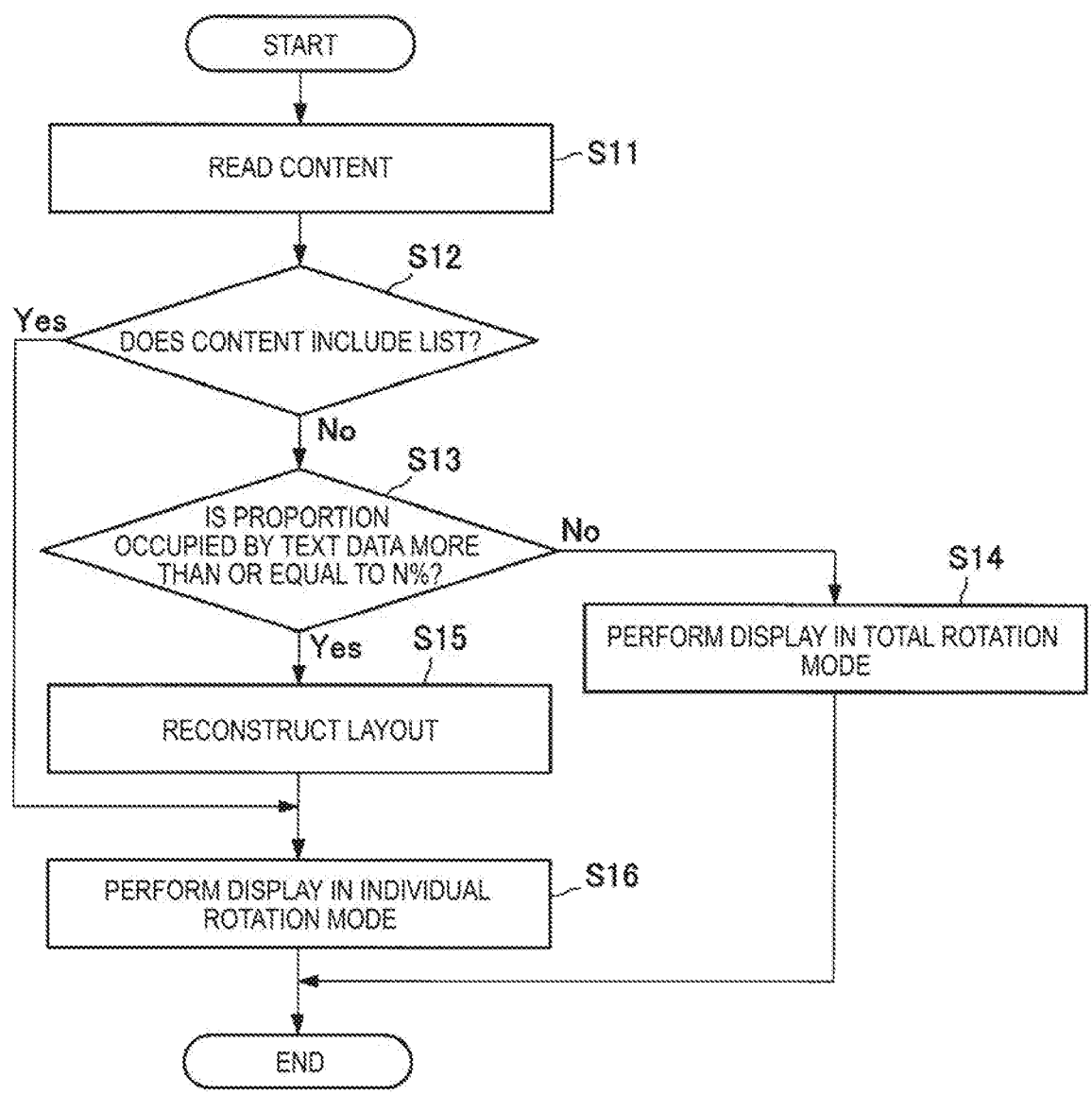
FIG. 19 is a flowchart showing an example of an operation of selecting a mode of a display control apparatus.

Heretofore, the detailed functions of the display control apparatus 10 according to an embodiment of the present disclosure have been described. Subsequently, with reference to FIG. 19 and FIG. 20 (and also with reference to other figures as appropriate), an operation of selecting a mode of the display control apparatus 10 according to an embodiment of the present disclosure will be described. FIG. 19 is a flowchart showing an example of an operation of selecting a mode of the display control apparatus 10. Note that, since the example shown in FIG. 19 is one of the examples of the operation of selecting a mode of the display control apparatus 10, the flow of the operation of selecting a mode of the display control apparatus 10 is not limited to the example shown in FIG. 19.

As shown in FIG. 19, first, in the display control apparatus 10, the data acquisition unit 111 reads content (S11). The content may be read from the storage unit 140, or may be read from another device through the communication unit 150. Subsequently, in the case where the content includes a list ("Yes" in S12), the display control unit 112 causes the operation to proceed to S16. On the other hand, in the case where the content does not include a list ("No" in S12), the display control unit 112 determines whether or not the proportion occupied by text data in the whole content is more than or equal to N % (S13).

In the case where the proportion occupied by text data in the whole content is less than N % ("No" in S13), the display control unit 112 selects the total rotation mode as the operation mode, and displays the content in the total rotation mode (S14). On the other hand, in the case where the proportion occupied by text data in the whole content is more than or equal to N % ("Yes" in S13), the display control unit 112 selects the individual rotation mode as the operation mode, reconstructs the layout in accordance with the individual rotation mode, and displays the content in the individual rotation mode (S16).

Figure 20:
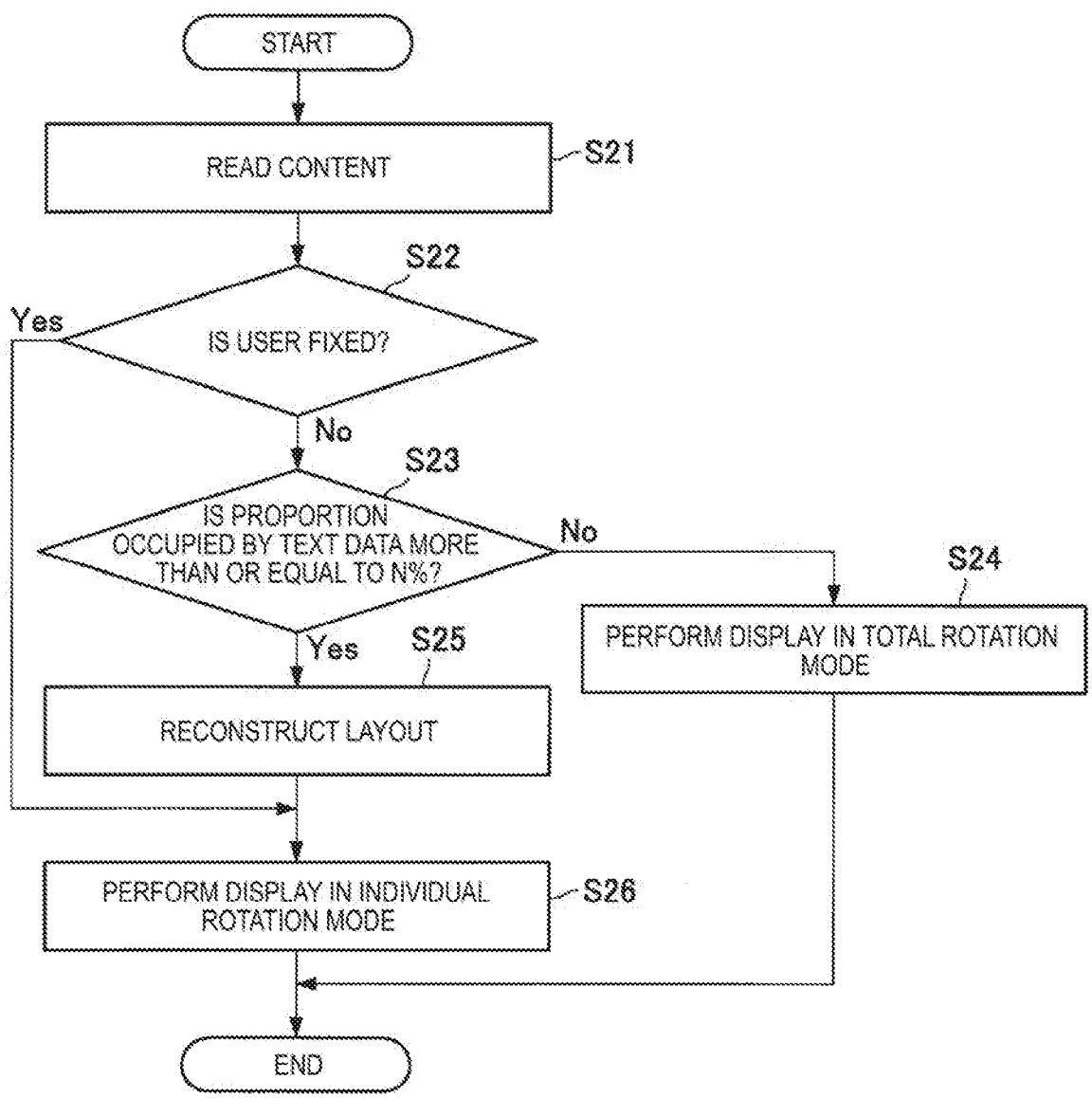
FIG. 20 is a flowchart showing another example of an operation of selecting a mode of a display control apparatus.

FIG. 20 is a flowchart showing another example of an operation of selecting a mode of the display control apparatus 10. Note that, since the example shown in FIG. 20 is one of the examples of the operation of selecting a mode of the display control apparatus 10, the flow of the operation of selecting a mode of the display control apparatus 10 is not limited to the example shown in FIG. 20.

As shown in FIG. 20, first, in the display control apparatus 10, the data acquisition unit 111 reads content (S21). The content may be read from the storage unit 140, or may be read from another device through the communication unit 150. Subsequently, in the case where a user is fixed ("Yes" in S22), the display control unit 112 causes the operation to proceed to S26. On the other hand, in the case where the user is not fixed ("No" in S22), the display control unit 112 determines whether or not the proportion occupied by text data in the whole content is more than or equal to N % (S23).

In the case where the proportion occupied by text data in the whole content is less than N % ("No" in S23), the display control unit 112 selects the total rotation mode as the operation mode, and displays the content in the total rotation mode (S24). On the other hand, in the case where the proportion occupied by text data in the whole content is more than or equal to N % ("Yes" in S23), the display control unit 112 selects the individual rotation mode as the operation mode, reconstructs the layout in accordance with the individual rotation mode, and displays the content in the individual rotation mode (S26).

Heretofore, the operation of selecting a mode of the display control apparatus 10 according to an embodiment of the present disclosure has been described.

<4. Example of hardware configuration of display control apparatus>

Subsequently, an example of hardware configuration of the display control apparatus 10 according to an embodiment of the present disclosure will be described. FIG. 21 is a diagram showing an example of hardware configuration of the display control apparatus 10 according to an embodiment of the present disclosure. However, the example of hardware configuration shown in FIG. 21 is merely an example of hardware configuration of the display control apparatus 10. Therefore, the hardware configuration of the display control apparatus 10 is not limited to the example illustrated in FIG. 21.

As illustrated in FIG. 21, the display control apparatus 10 include a central processing unit (CPU) 801, read only memory (ROM) 802, random access memory (RAM) 803, a sensor 804, an input device 808, an output device 810, a storage device 811, a drive 812, and a communication device 815.

The CPU 801 functions as an arithmetic processing unit and a controller, and controls overall operations inside the display control apparatus 10 according to various programs. Also, the CPU 801 may be a microprocessor. The ROM 802 stores programs or arithmetic parameters data and the like which are used by the CPU 801. The RAM 803 temporarily stores programs which are used in the execution of the CPU 801, or parameters which are appropriately changed upon execution thereof. Those are mutually connected with each other through a host bus configured from a CPU bus or the like.

The sensor 804 includes various detection sensors, such as a state detection sensor for detecting a state of the display control apparatus 10, and peripheral circuits thereof. Examples of the sensor 804 may include a positioning sensor, a tilt sensor, an acceleration sensor, a direction sensor, a temperature sensor, a humidity sensor, and an illuminance sensor. A signal detected by the sensor 804 is transmitted to the CPU 801. In this way, the CPU 801 can know the state (position, tilt, acceleration, direction, temperature, humidity, illumination, or the like) of the display control apparatus 10.

The input device 808 includes an operation unit configured to allow the user to input information, such as a mouse, a keyboard, a touch panel, a button (power button or the like), a microphone, a switch, a dial, and a lever, and an input control circuit configured to generate an input signal based on a user input and output the input signal to the CPU 801. The user of the display control apparatus 10 can input various data or give instruction on the processing operations to the display control apparatus 10 by operating the input device 808. Also, the installation position of the operation unit is not particularly limited. For example, the operation unit may be installed on a housing side surface of the display control apparatus 10, or may be installed on the same surface as the surface on which a display is installed.

The output device 810 may include a display device such as, for example, a liquid crystal display (LCD), an organic light emitting diode (OLED), and a lamp. Further, the output device 810 may include an audio output device such as a speaker and a headphone. For example, the display device displays a captured image or a generated image. On the other hand, the audio output device converts audio data or the like into audio.

The storage device 811 is a device for data storage that is configured as an example of the storage unit of the display control apparatus 10. The storage device 811 may include a storage medium, a recording device that records data in the storage medium, a reading device that reads data from the storage medium, and an erasing device that erases data recorded on the storage medium. The storage device 811 stores programs or various data which are executed by the CPU 801.

The drive 812 is a reader/writer for storage medium and is internally or externally mounted in the display control apparatus 10. The drive 812 reads information recorded in a removable storage medium, such as a magnetic disk, an optical disk, a magneto-optical disk, or a semiconductor memory mounted thereon, and outputs the read information to the RAM 803. Also, the drive 812 can write information to the removable storage medium.

The communication device 815 communicates with an external device through a network (or directly). The communication device 815 may be an interface for wireless communication. For example, the communication device 815 may include a communication antenna, a radio frequency (RF) circuit, a baseband processor, and the like. Specific examples of the interface for wireless communication may include a communication unit such as a modem supporting a communication scheme, such as a code division multiple access (CDMA), a wideband code division multiple access (W-CDMA), a long term evolution (LTE), a wireless fidelity (Wi-Fi, registered trademark).

Also, the communication device 815 may be an interface for wired communication. For example, the communication device 815 may include a connection terminal, a transmission circuit, and a circuit for other communication processing. Also, the CPU 801 and the communication device 815 may be configured by a single chip, or may be implemented as separate devices. Also, although not illustrated in FIG. 21, the display control apparatus 10, for example, may be driven by power supplied from a power source such as a rechargeable battery, and the power source may be configured to be detachable from the display control apparatus 10.

In the above, the example of hardware configuration of the display control apparatus 10 according to an embodiment of the present disclosure has been described. For example, the communication unit 150, the input unit 120, the display unit 160, and the storage unit 140 can be realized by the communication device 815, the input device 808, the output device 810, and the storage device 811, respectively. Also, the control unit 110 (in particular, the data acquisition unit 111 and the display control unit 112) can be realized by the CPU 801. Therefore, a program causing a computer to function as the display control apparatus 10 including the data acquisition unit 111 and the display control unit 112 can be stored in the storage device 811, the ROM 802, or the RAM 803, and the CPU 801 can execute the relevant program.

Also, the configuration for outputting display control information to the display unit 160 corresponds to an example of the "output unit". As a specific example, the output unit can be realized by a device such as a signal line positioned between the CPU 801 and the bus 806 shown in FIG. 21. Also, the display control information can be realized by a video signal such as an RGB signal or a high-definition multimedia interface (HDMI) used for controlling the output device 810 (for example, display, or the like) by the CPU 801.

If the operation of the above-described display control apparatus 10 is realized, the position of each constituent illustrated in FIG. 2 is not particularly limited. As a specific example, each of the input unit 120, the display unit 160, the control unit 110, and the storage unit 140 may be provided in different information processing devices connected through the network. In this case, the information processing device in which the control unit 110 and the storage unit 140 are provided, for example, may correspond to a server such as a web server or a cloud server, and the input unit 120 and the display unit 160 may correspond to a client connected to the network.

As described above, in the case where the function of the display control apparatus 10 is realized by the client and the server, the constituent (for example, communication interface such as a modem) in which the server including the display control unit 112 transmits the display control information to the client through the network corresponds to an example of the "output unit".

Also, in the case where the function of the display control apparatus 10 is realized by the client and the server, the contents of the display control information may be appropriately changed according to the system configuration. As a specific example, in the case where the described-above screen is displayed on the browser of the client side, the display control information may be realized by a markup language, such as a hyper text markup language (HTML), a standard generalized markup language (SGML), an extensible markup language (XML), or the like.

Also, the above display control information is merely an example and may be appropriately changed according to a method for transmitting and receiving information between the display control unit 112 and the display unit 160, a type of a transmission line, or a medium (for example, a wireless signal or light) used in information transmission and reception.

Also, in the above, the example in which the display control apparatus 10 is realized by the wearable display device was described. However, in the case where the function of the display control apparatus 10 is realized by the client and the server, the client may be realized by the wearable display device.

<5. Conclusion>

As described above, according to an embodiment of the present disclosure, there is provided the display control apparatus 10 including the display control unit 112 configured to control the display unit 160 in a manner that content is displayed on the basis of a mode selected from multiple modes, the multiple modes including at least a mode in which the content is displayed obliquely with respect to a direction of a side of a display area. According to such a configuration, it is possible to display content such that a user can view the content more easily.

The preferred embodiments of the present disclosure have been described in detail with reference to the appended drawings, but the technical scope of the present disclosure is not limited to such examples. It should be understood by those skilled in the art that it is apparent that various modifications and alterations may occur within the scope of technical idea described in the appended claims and this is understood that it naturally belongs to the technical range of the disclosure.

For example, in the above description, an example in which the individual rotation mode or the total rotation mode is selected as the operation mode of the display control apparatus 10 has been described. However, a mode other than the individual rotation mode and the total rotation mode may also be selected as the operation mode of the display control apparatus 10. To be specific, the display control unit 112 may select a mode in which content is displayed substantially parallel with respect to the direction of a side of the display area (hereinafter, may also be referred to as "parallel display mode"). When such a mode is selected is not limited, however, the mode may be selected in accordance with settings performed by a user, or may be selected depending on the gradient of the display area.

Further, as described above, the individual rotation mode may include a mode in which the degree of gradient of the divided object is changed depending on the gradient of the display area (hereinafter, may also be referred to as "gradient-variable individual rotation mode") and a mode in which the degree of gradient of the divided object is set beforehand (hereinafter, may also be referred to as "gradient-fixed individual rotation mode"). Accordingly, the display control unit 112 may select an operation mode from the parallel display mode, the individual rotation mode, and the total rotation mode. Which of the modes should be selected under what situation is not particularly limited. For example, the display control unit 112 may select, from among those modes, an operation mode in accordance with settings performed by a user, or an operation mode depending on the gradient of the display area.

In addition, the total rotation mode may also include a mode in which the degree of gradient of the content is changed depending on the gradient of the display area (hereinafter, may also be referred to as "gradient-variable total rotation mode") and a mode in which the degree of gradient of the content is set beforehand (hereinafter, may also be referred to as "gradient-fixed total rotation mode).

Accordingly, the display control unit 112 may select an operation mode from the parallel display mode, the gradient-variable individual rotation mode, the gradient-fixed individual rotation mode, the gradient-variable total rotation mode, and the gradient-fixed total rotation mode. Which of the modes should be selected under what situation is not particularly limited. For example, the display control unit 112 may select, from among those modes, an operation mode in accordance with settings performed by a user, or an operation mode depending on the gradient of the display area.

Further, the gradient-variable individual rotation mode, the gradient-fixed individual rotation mode, the gradient-variable total rotation mode, and the gradient-fixed total rotation mode may each include an area in which an object is displayed substantially parallel to the direction of a side of the display area in the display area. In this case, an object that is displayed in the display area obliquely with respect to the direction of a side of the display area and an object that is displayed substantially parallel to the direction of a side of the display area may be present. In particular, the gradient-variable total rotation mode and the gradient-variable individual rotation mode may include an area in which an object is displayed in the display area independently on the gradient of the display area and substantially parallel to the direction of a side of the display area.

Further, in the case where a predetermined condition is satisfied, the display control unit 112 may change the operation mode from the parallel display mode to the individual rotation mode or to the total rotation mode. The predetermined condition is not limited, however, it may be a condition that a user swings up his/her arm. The condition that the user swings up his/her arm may be a condition in which acceleration in a predetermined direction in a predetermined magnitude is detected by an acceleration sensor. The operation mode may be returned to the parallel display mode after the individual rotation mode or the total rotation mode has been continued for a predetermined time period.

For example, the operation of the display control apparatus 10 is not necessarily performed in time series in order described in the flowchart. For example, the operation of the display control apparatus 10 may be performed in a different order from that described in the flowchart, or at least a part of the operation described in the flowchart may be performed in parallel.

Also, hardware embedded in the computer, such as a CPU, ROM, and RAM, can be implemented by a program for exhibiting the same functions as the functions of the above-described display control apparatus 10. Also, it is possible to provide a non-transitory computer-readable recording medium storing the relevant program.

Also, the effects described herein are only for illustrative or explanatory purposes, not limiting purposes. That is, it is apparent to those skilled in the art that other effects from the description herein can be provided, in addition to or alternative to the above effects, in the relevant technology in the disclosure.

Additionally, the present technology may also be configured as below.

(1)

A display control apparatus including a display control unit configured to control a display unit in a manner that content is displayed on a basis of a mode selected from a plurality of modes, wherein the plurality of modes include at least a mode in which an object included in the content is displayed obliquely with respect to a direction of a side of a display area.

(2)

The display control apparatus according to (1), wherein the plurality of modes include an individual rotation mode in which the object that is displayed obliquely with respect to the direction of the side includes a plurality of divided objects, and the plurality of divided objects each have a center of rotation, the rotation being carried out from a substantially parallel state to an oblique state with respect to the direction of the side of the display area.

(3)
The display control apparatus according to (2),
wherein a scroll direction of the divided objects in the individual rotation mode is one of a direction of one side of the display area and a direction of another side of the display area.

(4)
The display control apparatus according to (3),
wherein the display control unit changes the scroll direction of the divided objects depending on a gradient of the display area.

(5)
The display control apparatus according to (4),
wherein, when the gradient of the display area exceeds a threshold, the display control unit rotates by a predetermined degree the scroll direction of the divided objects.

(6)
The display control apparatus according to any one of (3) to (5),
wherein the display control unit displays an indicator showing a current display position on a basis of the scroll direction.

(7)
The display control apparatus according to any one of (3) to (6),
wherein, in the individual rotation mode, in a case where a movement direction of an operating object and the scroll direction are different from each other, the display control unit moves the content in the scroll direction such that a movement distance of the content is larger than a scroll direction component of a movement distance of the operating object.

(8)
The display control apparatus according to any one of (2) to (7),
wherein, when a divided object of a top end or a bottom end reaches the display area, the display control unit makes a display mode of the divided object different from a display mode of another divided object.

(9)
The display control apparatus according to any one of (2) to (8),
wherein the display control unit changes a shape of each of the divided objects depending on a gradient of the display area.

(10)
The display control apparatus according to (9),
wherein, when the gradient of the display area exceeds a threshold, the display control unit changes an aspect ratio of each of the divided objects.

(11)
The display control apparatus according to any one of (2) to (10),
wherein the display control unit determines, depending on information associated with the divided objects, a divided object to be displayed in an area including a diagonal line of the display area.

(12)
The display control apparatus according to any one of (2) to (11),
wherein the plurality of modes include a total rotation mode in which a center of rotation of the content as a whole is present.

(13)
The display control apparatus according to (12),
wherein, when an end of the content reaches the display area, the display control unit rotates the content.

(14)
The display control apparatus according to (12),
wherein the display control unit selects the individual rotation mode or the total rotation mode.

(15)
The display control apparatus according to (14),
wherein the display control unit selects the individual rotation mode or the total rotation mode depending on an amount of text data included in the content.

(16)
The display control apparatus according to (14),
wherein the display control unit selects the individual rotation mode when a list is included in the content.

(17)
The display control apparatus according to any one of (2) to (16),
wherein the display control unit displays a predetermined object in a space between the content that is displayed obliquely with respect to the direction of the side of the display area and a plurality of adjacent sides of the display area.

(18)
The display control apparatus according to any one of (1) to (17),
wherein, when an end of the content reaches the display area, the display control unit displays a predetermined object in a space generated between the end of the content and a plurality of adjacent sides of the display area.

(19)
A display control method including
controlling a display unit in a manner that content is displayed on a basis of a mode selected from a plurality of modes,
wherein the plurality of modes include at least a mode in which an object included in the content is displayed obliquely with respect to a direction of a side of a display area.

(20)
A program for causing a computer to function as a display control apparatus, the display control apparatus including
a display control unit configured to control a display unit in a manner that content is displayed on a basis of a mode selected from a plurality of modes,
wherein the plurality of modes include at least a mode in which an object included in the content is displayed obliquely with respect to a direction of a side of a display area.

REFERENCE SIGNS LIST

10 display control apparatus
110 control unit
111 data acquisition unit
112 display control unit
120 input unit
130 sensor unit
140 storage unit
150 communication unit
160 display unit
C content
D1 to D3 divided object
D11 to D13 divided object
D21 to D23 divided object
D31 to D33 divided object
De divided object
G10 to G12 image
G20, G21 image Ind indicator
N1 corner
Obj object
P1, P2 object
R1 movable region
Sc scroll direction
T text data

The invention claimed is:

1. A display control apparatus, comprising:
a display control unit configured to:
control a display unit to display content in a first state, wherein the content includes a plurality of objects;
select an individual rotation mode from a plurality of modes;
rotate each of the plurality of objects such that a positional relationship between the plurality of objects is maintained while the plurality of objects are scrolled in a scroll direction,
wherein the scroll direction of the plurality of objects in the individual rotation mode corresponds to one of a first direction of a first side of the display unit or a second direction of a second side of the display unit;
control, based on the rotation of each of the plurality of objects, the display unit to display the content in a second state,
wherein, in the second state, each of the plurality of objects is oblique with respect to the first direction;
move the content in the scroll direction such that a first movement distance of the content is larger than a scroll direction component of a second movement distance of an operating object based on:
a movement direction of the operating object that is substantially vertical to the first side of the display unit, and
the scroll direction that is horizontal to the first side of the display unit; and
display a global user interface (UI) item, from one of a home button, a voice recognition button, or a screen off button, in a space between the content in the second state and a plurality of adjacent sides of the display unit.

2. The display control apparatus according to claim 1, wherein the display control unit is further configured to change the scroll direction of the plurality of objects based on a gradient of the display unit.

3. The display control apparatus according to claim 2, wherein the display control unit is further configured to:
determine whether the gradient of the display unit exceeds a threshold value; and
rotate, based on the determination, the scroll direction of the plurality of objects.

4. The display control apparatus according to claim 1, wherein
the display control unit is further configured to display an indicator, and
the indicator corresponds to a display position of each of the plurality of objects in the second state, that is based on the scroll direction.

5. The display control apparatus according to claim 1, wherein the display control unit is further configured to:
determine, in the second state, at least one portion of the content that reaches an end of the display unit; and
set, based on the at least one portion, a first display mode of a first object of the plurality of objects different from a second display mode of a second object of the plurality of objects.

6. The display control apparatus according to claim 1, wherein the display control unit is further configured to change a shape of each of the plurality of objects based on a gradient of the display unit.

7. The display control apparatus according to claim 6, wherein the display control unit is further configured to:
determine whether the gradient of the display unit exceeds a threshold value; and
change, based on the determination, an aspect ratio of each of the plurality of objects.

8. The display control apparatus according to claim 1, wherein the display control unit is further configured to determine a first object of the plurality of objects, for display in an area including a diagonal line of the display unit, based on information associated with the plurality of objects.

9. The display control apparatus according to claim 1, wherein
the plurality of modes includes a total rotation mode, and
in the total rotation mode, the content has a center of rotation.

10. The display control apparatus according to claim 9, wherein the display control unit is further configured to:
determine at least one portion of the content that reaches an end of the display unit; and
rotate the content around the center of rotation of the content based on the at least one portion.

11. The display control apparatus according to claim 9, wherein the display control unit is further configured to select from, the individual rotation mode and the total rotation mode, the individual rotation mode based on an amount of text data included in the content.

12. The display control apparatus according to claim 1, wherein the display control unit is further configured to select the individual rotation mode based on a list in the content.

13. The display control apparatus according to claim 1, wherein the display control unit is further configured to:
determine, in the second state, at least one portion of the content that reaches an end of the display unit; and
display, based on the at least one portion, an object in the space between the content in the second state and the plurality of adjacent sides of the display unit.

14. The display control apparatus according to claim 1, wherein a first object of the plurality of objects has a first center of rotation, and a second object of the plurality of objects has a second center of rotation.

15. A display control method, comprising:
controlling a display unit to display content in a first state, wherein the content includes a plurality of objects;
selecting an individual rotation mode from a plurality of modes;
rotating each of the plurality of objects such that a positional relationship between the plurality of objects is maintained while the plurality of objects are scrolled in a scroll direction,
wherein the scroll direction of the plurality of objects in the individual rotation mode corresponds to one of a first direction of a first side of the display unit or a second direction of a second side of the display unit;
controlling, based on the rotation of each of the plurality of objects, the display unit to display the content in a second state,
wherein, in the second state, each of the plurality of objects is oblique with respect to the first direction;
moving the content in the scroll direction such that a first movement distance of the content is larger than a scroll direction component of a second movement distance of an operating object based on:
  a movement direction of the operating object that is substantially vertical to the first side of the display unit, and
  the scroll direction that is horizontal to the first side of the display unit; and
displaying a global user interface (UI) item, from one of a home button, a voice recognition button, or a screen off button, in a space between the content in the second state and a plurality of adjacent sides of the display unit.

16. A non-transitory computer-readable medium having stored thereon, computer-executable instructions, which when executed by a processor of a display control apparatus, cause the processor to execute operations, the operations comprising:
  controlling a display unit to display content in a first state, wherein the content includes a plurality of objects;
  selecting an individual rotation mode from a plurality of modes;
  rotating each of the plurality of objects such that a positional relationship between the plurality of objects is maintained while the plurality of objects are scrolled in a scroll direction,
  wherein the scroll direction of the plurality of objects in the individual rotation mode corresponds to one of a first direction of a first side of the display unit or a second direction of a second side of the display unit;
  controlling, based on the rotation of each of the plurality of objects, the display unit to display the content in a second state,
  wherein, in the second state, each of the plurality of objects is oblique with respect to the first direction;
  moving the content in the scroll direction such that a first movement distance of the content is larger than a scroll direction component of a second movement distance of an operating object based on:
    a movement direction of the operating object that is substantially vertical to the first side of the display unit, and
    the scroll direction that is horizontal to the first side of the display unit; and
  displaying a global user interface (UI) item, from one of a home button, a voice recognition button, or a screen off button, in a space between the content in the second state and a plurality of adjacent sides of the display unit.

* * * * *